C. P. SMITH.
ANTISKID DEVICE FOR VEHICLE WHEELS.
APPLICATION FILED SEPT. 23, 1918.
1,331,945.
Patented Feb. 24, 1920.
2 SHEETS—SHEET 1.
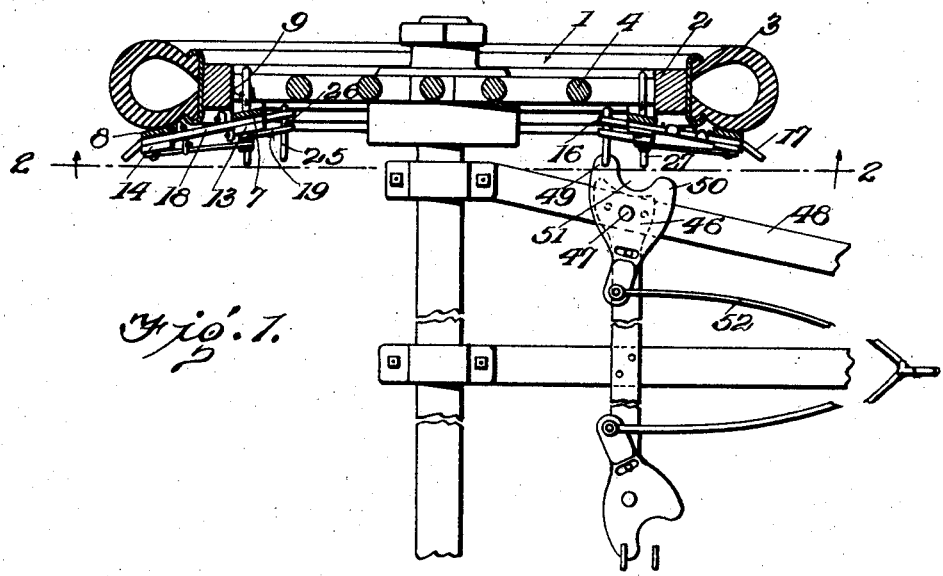
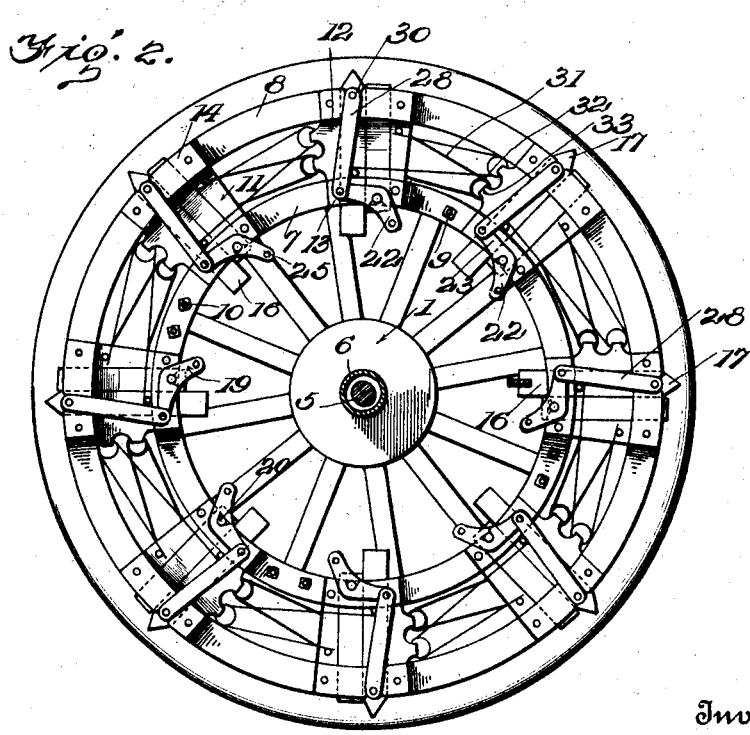
Inventor
C. P. Smith.
By Lacey & Lacey Attorneys Inventor
C. P. Smith.
By Lacey & Lacey, Attorneys

UNITED STATES PATENT OFFICE.

CHARLES P. SMITH, OF LOUISVILLE, KENTUCKY.

ANTISKID DEVICE FOR VEHICLE-WHEELS.

1,331,945.     Specification of Letters Patent.     Patented Feb. 24, 1920.

Application filed September 23, 1918. Serial No. 255,325.

*To all whom it may concern:*

Be it known that I, CHARLES P. SMITH, a citizen of the United States, residing at Louisville, in the county of Jefferson and State of Kentucky, have invented certain new and useful Improvements in Antiskid Devices for Vehicle-Wheels, of which the following is a specification.

This invention relates to anti-skid devices for automobile and other vehicle wheels and has as its primary object to provide a device permanently carried by each of the rear wheels and embodying an anti-skid element which may be caused to be projected into road engaging position through the mere operation of a foot pedal or hand lever and which may be similarly retracted.

A further object of the invention is to provide a device for the purpose stated so constructed that when the road engaging elements are projected they will so engage the road surface as to effectually prevent skidding of the wheels toward either side and when in retracted position will in no way impair the resiliency of the cushioning devices for the wheels by which they are carried.

Ordinarily devices of this class are so constructed that their road engaging elements, when projected, are rigidly held in such position and as a consequence such devices are not adapted to meet all road conditions. They may work satisfactorily where the road surface is of dirt or other relatively non-compact material, but on macadam or concrete roads, for example, or on asphalt pavements they are unsuitable for use as they will either dig into the road surface in a manner to greatly injure the same or will themselves become damaged by impact with the road surface if the same is too hard to be penetrated by the said engaging elements. Therefore, it is an object of the present invention to provide a device of this class embodying road surface engaging elements which in their projected position will be so held as to be yieldable to a desired degree upon impact with a road surface which they cannot penetrate or which it is undesirable that they should penetrate, injury to the road surface and to the anti-skid device itself being in this manner entirely obviated as well as the disagreeable and annoying jarring which attends the use of anti-skid devices in which the corresponding elements are non-yieldably held in projected position.

A further object of the invention is to so construct the anti-skid device that the presence and operation of the means provided for actuating the road engaging elements to project and retract the same will not in any way impede the progress of the machine, there being an absence of any direct connection whatsoever between the parts of the device carried by the rear wheels and the device directly actuated through the movement of the operating pedal or lever.

A further object of the invention is to so construct the device that the road engaging elements will be independently yieldable when in projected position so that the yielding of any one of the elements will not be resisted by reason of any connection between it and any other or others of the elements. In this respect also the invention has as its object to so construct the means for actuating or tripping the said elements to project and retract the same that the said elements will be individually tripped and successively in the rotation of the wheel by which they are carried so that no great strain will be imposed upon the tripping means liable to disarrange or injure the same, and on the other hand, as stated above, no strain will be imposed such as would tend to retard the progress of the vehicle at the time the tripping means is operated.

In the accompanying drawings:

Figure 1 is a horizontal sectional view illustrating the device embodying the present invention applied to an automobile wheel, certain of the parts of the device being shown in plan and others in section;

Fig. 2 is a vertical sectional view on the line 2—2 of Fig. 1 illustrating the device in elevation;

Figure 3:
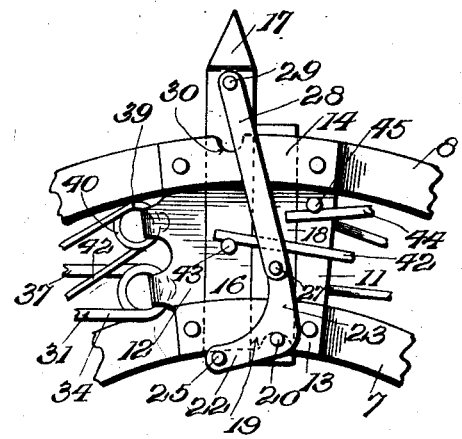
Fig. 3 is a view in side elevation of a portion of the device illustrating one of the road engaging elements and its associated parts, the said element being projected.

The device embodying the present invention is to be applied to the rear wheels of the vehicle and in the drawings the numeral 1 indicates in general one of the rear wheels, 2 the felly thereof, 3 the pneumatic tire, and 4 the spokes, the rear axle being indicated by the numeral 5 and being housed within the usual rear axle casing 6.

The device embodying the present invention includes an annular supporting frame for the road engaging elements and their associated parts. This frame stands at the inner side of the wall and comprises an inner annular plate 7 and an outer annular plate 8. The plates 7 and 8 are concentrically arranged with relation to each other and to the axis of the wheel and are connected and relatively braced in a manner which will be presently explained. It will also be observed by reference to Fig. 1 of the drawings that the plates 7 and 8 are relatively laterally displaced; that is to say, the plate 7 is displaced laterally in an outward direction with relation to the plate 8 so that the frame as a whole may be said to be dished, and the purpose of thus forming the frame will be presently set forth. In order to secure the frame to the wheel 1, suitable U-clips 9 are disposed to embrace certain of the spokes 4 of the wheel and have their ends fitted through openings in the inner plate 7, nuts 10 being applied to the said inner ends of the bolts. By constructing the frame in this manner, the same may be readily applied to and detached from any ordinary vehicle wheel without in any way altering the construction of the wheel itself.

Figure 4:
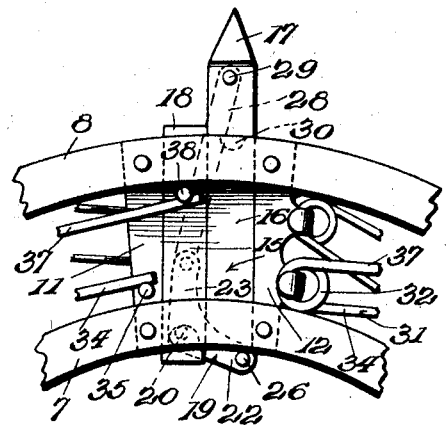
Fig. 4 is a similar view looking at the opposite side of the said element and its said associated parts.
Figure 5:
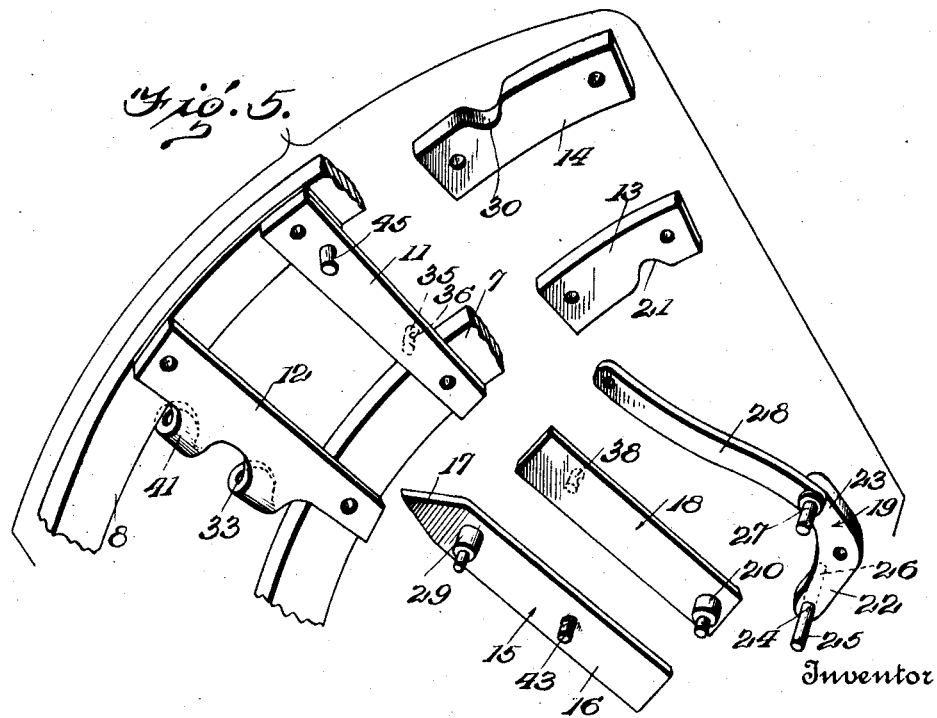
Fig. 5 is a group perspective view illustrating the parts shown in Figs. 3 and 4 disassembled.

The means above referred to for relatively bracing the frame plates 7 and 8 constitutes also an anchoring means for certain springs to be hereinafter more specifically described and as a guiding means for the road engaging elements and the projecting members associated therewith, and the means referred to comprises plates 11 and 12 which are arranged in an annular series of sets and which are riveted or otherwise secured at their inner and outer ends respectively to the plates 7 and 8, as clearly shown in Figs. 3, 4 and 5 of the drawings, the said plates 11 and 12 extending radially with relation to the center of the frame of the device. In order to complete the guiding means for the road engaging elements and their projecting members segmental plates 13 and 14 are also provided and these plates, which correspond in curvature respectively to the plates 7 and 8, are riveted or otherwise secured at their ends respectively to the inner and outer ends of the plates 11 and 12 so as to span the space between the said ends of the plates 11 and 12 of each set. It will be evident by reference to Fig. 1 of the drawings that the plates 13 and 14 are located in position facing but spaced from the outer faces of the plates 7 and 8 so that the road engaging elements and the respective projecting members may be guided between the said plates 13 and 14 and 7 and 8 as well as between the adjacent or opposing edges of the plates 11 and 12. Each road engaging element, indicated in general by the numeral 15, comprises a shank 16 formed at its outer end with a road engaging tooth or spur 17 which is deflected at an angle to the plane of the shank, as clearly shown in Fig. 1 of the drawings. The shank 16 of the road engaging element 15 is slidably disposed against the inner faces of the plates 7 and 8 in the manner clearly shown in the said Fig. 1 and with one lateral edge resting slidably against the inner lateral edge of the respective plate 12, the shank 16 being held in place by the plates 13 and 14. The projecting member for the road engaging element is indicated in general by the numeral 18 and comprises a flat sided bar of substantially the same thickness and width as the shank of the road engaging element, but of a length somewhat less than the length of the said shank 16 and this projecting member is slidably disposed against the inner faces of the plates 7 and 8 with one lateral edge slidably engaging the adjacent lateral edge of the shank of the respective road engaging element and its other lateral edge slidably engaging the inner lateral edge of the respective plate 11. As in the case of the road engaging elements, the plates 13 and 14 serve to retain the projecting members in place. There is provided between each road engaging element 15 and its respective projecting member 18, a connection which when the road engaging element is projected serves to connect the said element and its projecting member for movement in unison but which permits of movement of the road engaging element to retracted position when the tripping means heretofore referred to is actuated in a manner to be presently explained. This connection includes a rocker or angle lever 19 which is pivotally mounted upon the reduced end of a stud 20 carried at the inner end of the respective projecting member 18. The inner portion of this stud, when the said member 18 is at the outward limit of its movement, is designed to seat in a notch 21 formed in the inner edge of the respective plate 13 thus limiting the said outward movement of the said member. The angle lever 19 includes arms 22 and 23 which extend at a suitable angle to each other, and the arm 22 carries at its outer end a transverse pin which projects at its ends beyond the opposite sides or faces of the arm 22. This pin is indicated in general by the numeral 24 and one of its projecting ends is indicated by the numeral 25 and the other by the numeral 26, the end 25 constituting a trip element and the end 26 a stop element as will be presently explained.

A pin 27 is carried by the outer end of the arm 23 and pivotally connected with this pin is one end of a link 28, the other end of which link is pivotally connected to a stud 29 carried by the outer end of the shank 16 of the road engaging element 15 and which stud is designed, in the retracted position of the said road engaging element to seat in a notch 30 formed in the outer edge of the respective plate 14. The engagement of this stud 29 in the said notch serves to limit the inward movement of the said road engaging element. At this point it will be evident and particularly by reference to Fig. 3 of the drawings, that the arm 23 and the link 28 constitute a toggle lever. This straightens out when the road engaging element 15 is in projected position, and now the link 28 and the arm 23 of the angle lever 19 will be nearly in alinement and the end 26 of the pin 24 will serve as a stop and engage against the inner end of the shank 16 of the said road engaging element, the stud 20 seating at such time in the notch 21. When the parts are thus relatively positioned substantially a direct thrust will be exerted against the angle lever 19 through the medium of the link 28, when force is exerted in an inward direction against the road engaging element. On the other hand, should the angle lever 19 be swung upon its pivot 20 to the position shown in Fig. 2 so that the links of the toggle are deflected, the end 26 of the pin 24 would be moved out of engagement with the inner end of the shank 16 of the road engaging element 15 and the arm 23 of the angle lever would be swung to such position that it and the link 28 would be out of alinement and it will further be understood that should the projecting element 18 be held stationary in this movement of the parts, the road engaging element would be moved inwardly or retracted independent of the said projecting member.

In order to yieldably hold the projecting member 18 at the outward limit of its sliding movement and therefore normally relatively stationary, a stout wire spring 31 is coiled between its ends as at 32 and has its coil engaged with a lug or ear 33 upon the outer lateral edge of the plate 12 of the adjacent set of plates 11 and 12. One arm of this spring, namely, the inner arm indicated by the numeral 34, bears at its end against a stud 35 upon the plate 11 near the inner end of the said plate. It is preferable that a notch 36 be formed in the stud to receive the said end of the arm 34 of the spring so as to prevent accidental disengagement of the arm from the stud. The other or outer arm of the spring, indicated by the numeral 37 bears outwardly against a stud 38 upon the face of the projecting member 18, and the resiliency of the spring tending to spread its arms apart, serves to yieldably hold the said projecting member at the outward limit of its movement. The resistance offered by these springs to the inward movement of the road engaging elements is sufficiently great to maintain the elements in projected position when traveling over muddy roads or roads which are of material sufficiently loose to render it desirable that the spurs 17 shall penetrate the road surface, but the springs are not so strong as to prevent inward yield of the road engaging elements when these elements come into contact with a macadam or concrete road, or an asphalt pavement, under which conditions it would be undesirable for the spurs to penetrate the road surface or strike the same without yielding. It will be understood, of course, from the foregoing that the springs 31 do not act directly against the road engaging elements but, on the other hand, act through the medium of the projecting members 18 because of the engagement of the ends 26 of the pins 24 against the inner ends of the said road engaging elements. In order to automatically retract the road engaging elements when the angle levers 19 are tripped or swung upon their pivots so as to move the pivots 27 connecting them and the links 28 to the position shown in Fig. 2 of the drawings, springs 39 (weaker than springs 31) are coiled between their ends as indicated by the numeral 40, and their coils are engaged with lugs or ears 41 upon the plates 12. One end of each of these springs, indicated by the numeral 42, bears at its end against a stud 43 upon the face of the respective road engaging element 15, and the other arm of the spring, indicated by the numeral 44, bears against a stud 45 upon the respective plate 11. The arms of the springs, of course, tend to separate through the resiliency of the springs and the springs are of such strength as to perform the function of inwardly sliding or retracting the road engaging elements but are not sufficiently strong to overcome the action of the springs 31 by resisting the force exerted by the latter springs to any appreciable degree.

The means provided for tripping the angle levers 19 of the several road engaging devices heretofore described includes heads and means for adjusting the abutment portions thereof selectively in the paths of movement of the ends 25 of the pins 24, and the pins 27. Each of these heads is indicated by the numeral 46 and each is pivotally mounted as at 47 upon a frame bar 48 located in juxtaposition to the inner side of the respective rear wheel of the vehicle. Each head 46 is provided with spaced abutments, one indicated by the numeral 49 and the other by the numeral 50, the space between these abutments being indicated by the numeral 51 and being substantially of a width slightly greater than the distance between the pins 24 and 27 of any one of the road engaging devices. Operating rods 52 are pivotally connected with the heads 46 at their inner ends or, in other words, at their ends opposite their abutment portions 49 and 50, and these rods 52 lead to and are suitably connected with any desired form of operating lever or pedal (not shown) located within convenient reach of the driver of the vehicle.

From the foregoing description of the invention, and assuming that the parts are in the positions shown in Fig. 2 of the drawings, the road engaging elements are retracted, and the points of the spurs 17 will be spaced inwardly from the line of tread of the wheel to such distance as to not come in contact with the road surface in the passage of the wheels thereover. Should the driver of the vehicle consider skidding of the vehicle imminent, the operating lever or pedal is so thrown as to bring the abutment portion 49 of each head 46 into the path of travel of the projecting ends 25 of the pins 24. As a result, as these ends of the pins pass the said portion 49, they will strike the portion and the angle levers 19 will be successively tripped or rocked upon their pivots 20 until they assume the position shown in Figs. 3 and 4 of the drawings. As the angle levers are so rocked, an outward thrust will be exerted against the links 28 and the road engaging elements 15 will be projected into engaging position in which position their spurs 17 will project beyond the line of tread of the tires of the wheels and will, therefore, be adapted to engage the road surface. As before pointed out, inward movement of the road engaging elements exerts a substantially direct thrust, through the links 28, against the angle levers 19 and their pivots 20 and, consequently, against the projecting members 18 so that such movement of the road engaging elements is against the tension of the springs 31 which yieldably resist inward movement of the said projecting members. Also, as before pointed out, the engagement of the ends 26 of the pins 24 against the inner ends of the road engaging elements serves to connect these elements for movement with the projecting members 18. After the danger point in the road has been passed and there is considered to be no further likelihood of the vehicle skidding, the road engaging elements may be restored to their retracted positions by throwing the operating lever or pedal in a manner to bring the abutment portions 50 of the heads 46 into the path of movement of the pins 27 of the respective road engaging devices, and as these pins strike and pass the said portion 50, the angle levers 19 will be tripped so as to cause all parts to resume the position shown in Fig. 2 of the drawings.

Having thus described the invention, what is claimed as new is:

1. In a device of the class described, a road engaging member guided for radial movement in a wheel, an angular rocker pivoted at its angle and having pins at the extremities of its arms, a link pivotally connecting one pin with said member and of such length that when the arm carrying this pin is in alinement with the link and the member is projected, the pin on the other arm extends across the inner end of said member, and means for tripping the rocker.

2. In a device of the class described, a road engaging member and a projecting member movable along side each other radially of a wheel, yielding means bearing the first member inwardly and the second member outwardly, an angle lever pivoted at its angle on the projecting member and having pins at the outer ends of its arms, a link pivoted at one end to the road member and at the other end on the pin of one arm and with said arm constituting a toggle lever, the arrangement of parts being such that when said toggle is straight the road member is projected and the pin on the other arm stands against the inner end of this member, and means for tripping the angle lever.

3. In an anti-skid device, a road engaging member, a projecting member associated therewith, the said members being relatively slidable in a radial direction, a rocking lever mounted upon one of the said members, a link connecting one arm of the lever with the other member, means yieldably urging the projecting member outwardly and the other member inwardly, and means for tripping the lever to change the position of the said link with relation to the pivot for the lever.

4. In an anti-skid device, a road engaging member and a projecting member mounted for relative sliding movement, a rocker carried by the projecting member, a link pivotally connected with the rocker and with the road engaging member, means yieldably holding the projecting member moved outwardly, and means for tripping the rocker.

5. In an anti-skid device, a road engaging member radially movable into and out of road engaging position, a projecting member associated with said engaging member, means yieldably holding the projecting members moved outwardly, a rocking element carried by the projecting member, a link connecting said element with the road engaging member, and means for tripping the said rocking element whereby to vary the position of the link with relation to a straight line passing through its pivot to the said rocking element and the pivot between the link and the road engaging member.

6. In an anti-skid device, a plurality of road engaging members and a plurality of projecting members associated therewith, the first-mentioned members being movable with relation to the last-mentioned members, means yieldably holding the projecting members moved in an outward direction, a rocker pivotally mounted upon each projecting member, a link pivotally connected with each rocker and with the respective road engaging member, means yieldably holding the road engaging members moved inwardly, trip elements carried by each rocker and located at the opposite sides of the pivot therefor, and means adjustable to be brought into the path of either set of trip elements selectively.

In testimony whereof I affix my signature.

CHARLES P. SMITH. [L. S.]